May 25, 1926.
G. ST. J. PERROTT ET AL
1,586,327
PURIFICATION OF AIR TO RENDER THE SAME SUITABLE FOR BREATHING
Filed Oct. 31, 1925
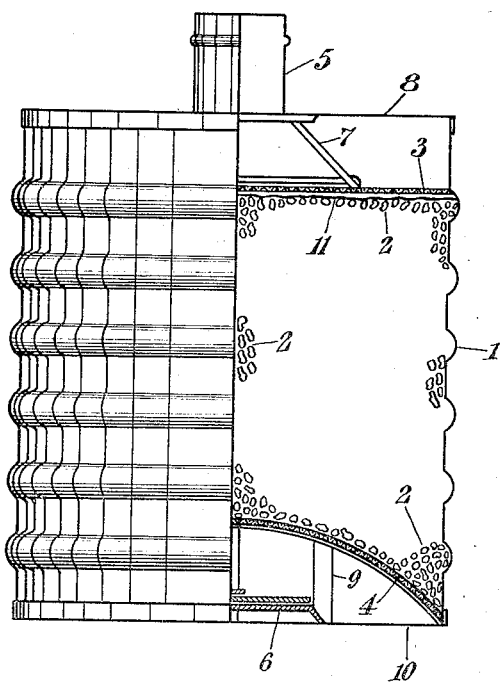
INVENTORS
George St. J. Perrott
Max Yablick
BY
ATTORNEYS.

Patented May 25, 1926.

1,586,327

UNITED STATES PATENT OFFICE.

GEORGE ST. J. PERROTT, OF PITTSBURGH, PENNSYLVANIA, AND MAX YABLICK, OF NEW YORK, N. Y.; SAID PERROTT ASSIGNOR TO SAID YABLICK.

PURIFICATION OF AIR TO RENDER THE SAME SUITABLE FOR BREATHING.

Application filed October 31, 1925. Serial No. 66,102.

This application is a continuation in part of our prior application Serial No. 270,606, filed January 10, 1919, now Patent 1,559,980, granted November 3, 1925.

It is well known that ammonia will react with acids to form ammonium salts, and this fact has been taken advantage of in the manufacture of canisters for gas masks for use in removing ammonia from air to render it suitable for breathing. Prior to our invention the acid used for this purpose was sulfuric acid. To render this acid or other acids in liquid form or in solution, available for use, it has been the practice to fill the canister with pumice stone or other inert carrier impregnated with the liquid. This was necessary in order to expose the acid in such form that the air to be treated could be drawn through without too high resistance which would be the case if the air were drawn through a body of liquid.

In order to secure satisfactory results, a large quantity of this filler has been needed, as the amount of acid used in respect to the amount of the carrier was limited to such quantity as would not drain off. Such apparatus was open to many objections, among which were the high heat of reaction, the formation of fumes due to the production of volatile ammonium salts, the highly corrosive action of the acid, and the large size and weight required for a canister suitable for use for a considerable length of time.

We have discovered that solid acids, and particularly crystalline acids, may be used to very great advantage, even though there is little or no reaction between the dry crystals of most acids and dry ammonia gas, which fact would seem to render them unsuitable for use to completely remove small quantities of ammonia from air to be breathed.

In carrying out our invention the solid acid is so supported as to present adequate surface for the action of the ammonia, and in such condition that it readily reacts with the ammonia, but with low resistance to the passage of air therethrough.

The preferred way of preparing the filler for the canister is as follows: To a concentrated solution of the acid is added an inert substance, preferably in finely subdivided state. This is preferably kieselguhr, although other material might be used for the same purpose, as for instance, powdered pumice stone and the like. The material should be such that it does not react with the acid, and is preferably of a porous nature. Enough of this inert material is added to the solution to form a thick paste. In making the saturated solution, it is preferable to use hot water, as a larger amount of acid is thereby taken in solution. If desired, small crystals or powder of the solid acid may be added to the saturated solution or to the paste, so as to further increase the amount of acid in proportion to the other material. The paste is stirred as it cools, and is thus formed into lumps or granules, or the mass may cool and set, and thereafter be broken up. The dry granules or lumps may be screened to remove the fines. If the solution be saturated when hot and the paste be thick, no drying is necessary, but if an excess of water is present it may be removed by air drying. As the paste cools or dries, the acid crystallizes out and the crystals thus formed act as a cement to hold together the small particles of the kieselguhr or the carrier, in the comparatively strong, hard lumps or granules which are porous by reason of the porous nature of the kieselguhr itself. If the acid be one whose crystals are physically weak and not satisfactory as a cementing agent, a small amount of hydraulic or oxychloride cement may be added in the paste, or the granules of the carrier may be of suitable mesh, such as 8 to 14 instead of powder form, in order to keep low the resistance to breathing. The granules present a very large surface including very small crystals of the acid, and also contain moisture as the granules are preferably not dried to anhydrous condition. This moisture facilitates immediate reaction of the ammonia gas and the solid acid when the two are brought together. Furthermore the acid used preferably has water of crystallization which may be replaced by the ammonia gas possibly to form ammonia of crystallization. The liberation of this moisture aids in effecting the direct reaction of the ammonia with the acid to form the ammonium salts.

There are various different acids which are suitable for use in carrying out our invention. Among these are water-soluble organic acids, such as tartaric, oxalic, succinic, gallic, citric, or tannic, and inorganic acids, such as silicic, boric, chromic, arsenic, or meta-phosphoric. A preferred example is boric acid which is of low cost, practically non-corrosive on the container, acts as a suitable bond for the filler, and removes the ammonia effectively. It has water of crystallization, in addition to the replaceable hydrogen atoms. The lumps or granules of the material are preferably packed in a canister, and the canister may be sealed so as to prevent the drying out of the moisture which is left in the granules, and which facilitates the reaction with the ammonia. If the acid used be of a hygroscopic nature the canister may be kept sealed when not in use, so as to prevent the absorption of too much moisture. Charcoal, fused calcium chloride, or other well-known dehydrating agent may be used in layers above and below the filler including the solid acid, so as to prevent absorption of too much moisture when not in use. If the acid be of a corrosive nature, the interior of the canister may be lined or coated with a covering of protective paint.

Although we prefer to use granules formed of a porous material in finely subdivided state, held together by crystals of the solid acid, we may in some cases omit the carrier and use merely the solid acid crystals. Such a canister is serviceable, but is not as efficient. The canister may be sealed with a sufficient amount of moisture therein to insure the proper action of the ammonia on the solid acid. If desirable, hygroscopic agents may be added to insure the presence of a sufficient amount of moisture. In some cases, as for instance silicic acid, the anhydride of the acid may be used.

Our material in its preferred form is of good mechanical strength, so that there is no danger of crushing, packing or dusting; it has adequate porosity to insure satisfactory gas-absorbing properties; it has high intrinsic activity; there is very low heat of reaction under ordinary conditions of use, due to the large surface exposed for action so the air may be breathed immediately after treatment; no caustic or other fumes are evolved during the absorbing action; the resistance to the passage of air is low and does not materially increase during the operation; the weight of the absorbent is low in respect to the weight of the ammonia which it is capable of absorbing; the efficiency is high for a considerable period of time; the absorbed ammonia is held or retained under the conditions under which it is absorbed. Some of the ammonia may be adsorbed in the pores of the filler in addition to that which enters into reaction with the acid or replaces water of crystallization in the latter.

Our improved absorbent when in use is preferably packed in a metal container, preferably of a type adapted for attachment to a gas mask.

The accompanying drawing illustrates an apparatus in which our absorbent material may be employed, but the details of the construction there shown form no portion of our invention. The canister 1 has absorbent material 2 packed between screens 3 and 4. The neck 5 of the canister is adapted to be attached to the hose of a gas mask and air which is to be purified may enter at the base of the canister through the valve 6. Air upon being sucked past the valve 6 and through the absorbent material 2, passes out through the neck 5 to the gas mask. During the passage of the air through the absorbent material, any ammonia or other gas which it may carry will be removed therefrom by the absorbent material 2.

In order to maintain the absorbent material in compact form and in proper position, this type of canister is provided with a spring 7 which presses against the screen 3 and the top 8 of the canister. The material rests on a dome-shaped screen 4 having supports 9 between it and the base 10 of the canister. A layer of fabric 11 may also be provided to remove particles of dust from the air before it passes into the neck 5.

Having thus described our invention, what we claim as new and desire to secure by Letters Patent is:—

1. An apparatus for treating ammonia-laden air to completely remove the ammonia therefrom and render the air suitable for breathing directly after treatment, including a container adapted for the passage of air therethrough, and having a filler including a solid acid.

2. An apparatus for treating ammonia-laden air to completely remove the ammonia therefrom and render the air suitable for breathing directly after treatment, including a container adapted for the passage of air therethrough, and having a filler including crystals of a solid acid.

3. An apparatus for treating ammonia-laden air to completely remove the ammonia therefrom and render the air suitable for breathing directly after treatment, including a container adapted for the passage of air therethrough, and having a filler including hydrated crystalline acid.

4. An apparatus for treating ammonia-laden air to completely remove the ammonia therefrom and render the air suitable for breathing directly after treatment, including a container adapted for the passage of air therethrough, and having a filler including a granular porous carrier impregnated with a solid acid.

5. An apparatus for treating ammonia-laden air to completely remove the ammonia therefrom and render the air suitable for breathing directly after treatment, including a container adapted for the passage of air therethrough, and having a filler including granules of small particles of kieselguhr held together by crystals of a solid acid.

6. An apparatus for treating ammonia-laden air to completely remove the ammonia therefrom and render the air suitable for breathing directly after treatment, including a container adapted for the passage of air therethrough, and having a filler including a mass of fine porous material held together in granules by crystals of a solid acid.

7. An apparatus for treating ammonia-laden air to completely remove the ammonia therefrom and render the air suitable for breathing directly after treatment, including a container adapted for the passage of air therethrough, and having a filler including crystals of boric acid.

8. An apparatus for treating ammonia-laden air to completely remove the ammonia therefrom and render the air suitable for breathing directly after treatment, including a container adapted for the passage of air therethrough, and having a filler including granules of a solid organic acid having water of crystallization.

9. The process of purifying air vitiated with a high concentration of ammonia to render the air suitable for breathing after purification, which consists in passing the air through a mass of granules formed of porous material and solid acid.

10. The process of purifying air vitiated with a high concentration of ammonia to render the air suitable for breathing after purification, which consists in passing the air in contact with crystals of solid acid.

GEORGE ST. J. PERROTT.
MAX YABLICK.